(No Model.)
G. T. HUNT.
CAKE BEATER.
No. 455,565. Patented July 7, 1891.
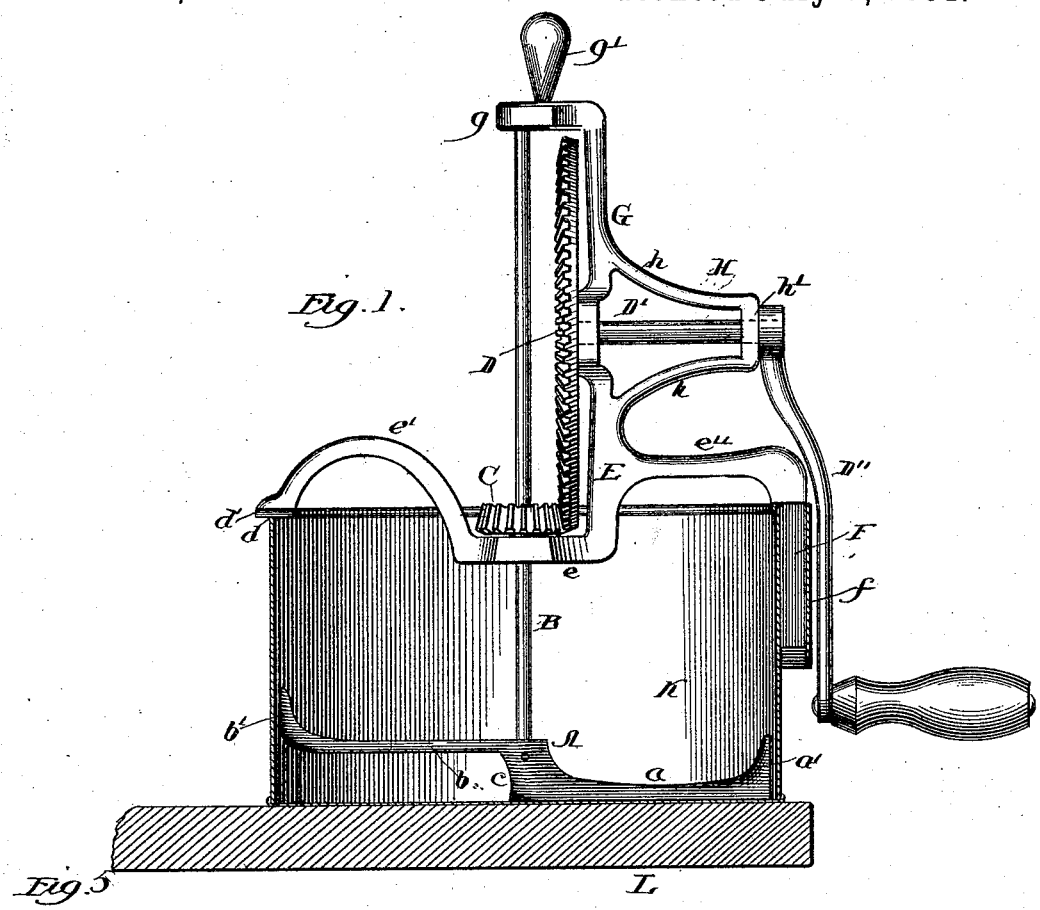
Fig. 1.
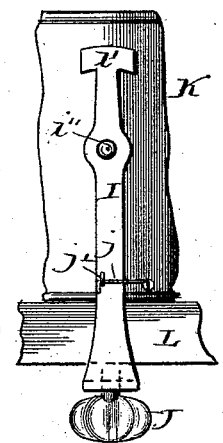
Fig. 5.
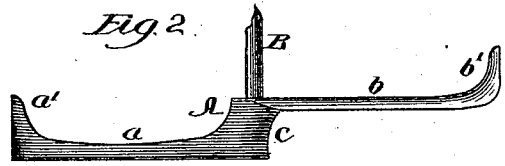
Fig. 2.
Fig. 3.
Fig. 4.
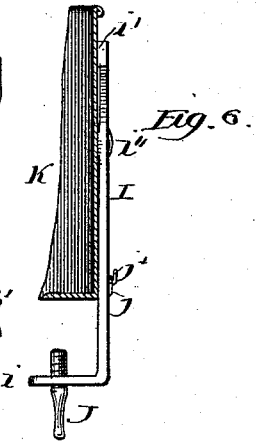
Fig. 6.
Witnesses:
Chas. O. Shewey
A. W. Bond
Inventor:
George T. Hunt

UNITED STATES PATENT OFFICE.

GEORGE T. HUNT, OF CHICAGO, ILLINOIS.

CAKE-BEATER.

SPECIFICATION forming part of Letters Patent No. 455,565, dated July 7, 1891.

Application filed March 23, 1891. Serial No. 386,134. (No model.)

*To all whom it may concern:*

Be it known that I, GEORGE T. HUNT, a citizen of the United States, residing at Chicago, in the county of Cook and State of Illinois, have invented certain new and useful Improvements in Cake-Beaters; and I do hereby declare that the following is a full, clear, and exact description of the invention, which will enable others skilled in the art to which it pertains to make and use the same, reference being had to the accompanying drawings, forming a part hereof, in which—

Figure 1 is a side elevation of the blade and its operating-gear, showing the receptacle in section. Fig. 2 is a side elevation of the blade, showing the reverse side from that shown in Fig. 1. Fig. 3 is a top or plan view of the blade. Fig. 4 is a section showing the upper arm of the blade removed. Fig. 5 is a front elevation of the clamp for attaching the apparatus as a whole to a table or other support. Fig. 6 is an edge view of the clamp shown in Fig. 5.

This invention relates to a device and apparatus more especially designed for beating cakes, but which can be used for beating other articles, and has for its objects to insure a perfect creaming and a thorough mixing of the ingredients without extra labor in a short period of time, to improve the construction and operation of the beater-blade and have the operation one which will not splash the material out of an open-topped receptacle, to construct a beater-blade which will both lift and cut the material and at the same time throw the material from the center outward and from the outer edge inward, and to improve generally the construction and operation of the device as a whole; and its nature consists in the several parts and combinations of parts hereinafter described, and pointed out as new in the claims.

In the drawings, A represents the beater-blade, formed of an arm $a$ and an arm $b$ projecting on opposite sides from a hub or center $c$. Each arm $a$ and $b$ has a forward cutting edge and an upper face with an inclination upward, so as to act and cut the ingredients with the forward edge, and at the same time lift the ingredients, and when in place in the receptacle the arm $a$ of the blade runs in close proximity to the bottom of the receptacle.

The hub or center $c$, which connects the two arms $a$ and $b$, is formed concave between its top and bottom and with a forward wind, so that when the blade is rotated the face of the hub or center will act and throw the material outward. The outer end of the arm $a$ is turned upward to form a lip $a'$, which lip has a forward cutting-edge, and the inside of the lip has a rounded face from the front edge to the rear edge, and this face also runs correspondingly at its juncture with the arm $a$, as shown in Figs. 1 and 3. The arm $b$ at its outer end is turned upward to form a lip $b'$, which lip has a forward cutting-edge and has its inner side formed with a rounded face from the front edge to the rear edge, which face is continued with the juncture of the lip to the arm $b$, as shown in Figs. 2 and 3.

The construction of the beater-blade A, as a whole, is one which operates to lift and cut the material, and such action is had by the forward cutting-edge of each arm $a$ and $b$ and the raising face on the top of each arm, and the material thus operated upon is held at a point between the center of the receptacle and the outer edge of the receptacle, and such holding is had by the action of the face of the edge or center $c$, which acts to throw the material from the center outward, and the material is thrown from the outer edge inward by the action of the lips $a'$ and $b'$ with their rounded inner sides. The arm $a$, running in close proximity to the bottom of the receptacle, keeps the material clear of the bottom, and the outer side of the lips $a'$ and $b'$, running in close proximity to the wall of the receptacle, will prevent adhesion of the material to the side of the receptacle, in connection with the inward throw of the material, by the action of the inner sides of the lips $a'$ and $b'$.

B is a shaft, to the lower end of which is secured by a pin or in any other suitable manner the center or hub $c$.

C is a bevel-pinion firmly secured to the shaft B.

D is a bevel-gear meshing with the driving-pinion C for rotating the shaft B and driving the beater-blade A as a whole. This gear D is firmly secured to one end of a shaft D', the other end of which has secured thereto a handle D''.

E is a cross-bar for mounting the beater as a whole on a receptacle. This cross-bar E has a central depressed portion e, just above which, on the shaft B, is located the pinion C, and from this center e on one side the bar is continued, as shown, with a curved portion e′, having at its end a plug d′, which enters a notch or recess d in the edge of the receptacle, and the bar E is completed by an upward and outward extension e″ from the center e, forming a bar as a whole of the required length to overlie the receptacle.

F is an arm depending from the portion e″ of the bar E, which arm F enters a socket f formed on the side of the receptacle, and furnishes a means for holding the operating parts of the beater in position on the receptacle.

G is an upward continuation of the bar E, having at its upper end an ear g to receive the upper end of the shaft B, and, as shown, this ear g has mounted thereon a handle g′, by means of which the beater can be held firm and steady.

H is a side bracket, formed by bars h extending from the bar E and the bar G outward, and united at their outer ends by a cross-piece h′, in which cross-piece and the bar G is mounted the shaft D′.

I is the bar of a clamp for securing the receptacle to a table or other support, which bar has an ear i at its lower end and a head i′ at its upper end, which head i′ is thicker than the bar, so as to give a bearing against the side of the receptacle and assist in holding the receptacle firmly in position, and this bar I is attached to the side of the receptacle by a suitable pivot i″.

J is a clamping-screw carried by the ear i of the bar I, which screw engages with the face of the table or other support in clamping the receptacle in position. The bar I is held so as to give a side support against the twisting of the receptacle in operating the beater by a hook j, pivoted to the side of the receptacle and engaging with a hook or eye j′, attached to the bar, as shown in Figs. 5 and 6.

K is the receptacle, made of tin or other suitable material and of the form shown or other desired shape.

L is the top of a table or other suitable support, to which the receptacle K is to be clamped.

The beater-blade A is secured to the lower end of the shaft B in any firm manner. The shaft is passed up through the center e of the cross-bar E and through the pinion C, and its upper end entered into the ear g. The pinion C is firmly secured to the shaft B and the gear D placed in position to mesh with the gear C, and the gear D is then firmly secured to the end of the shaft D′, and the handle D″ is attached to the outer end of the shaft, which assembles the operating parts of the beater.

In use the receptacle K is clamped to a table or other support or held in the lap or otherwise, as may be desired, and the operating parts of the beater are placed in position for the beater-blade to lie within the receptacle, as shown in Fig. 1, by entering the arm F into the socket f and the lug d′ into the notch d. The ingredients to be mixed are then placed in the receptacle K and motion imparted to the beater-blade A by the handle D″ through the pinion C and gear D, and such motion of the beater-blade A will rapidly and efficiently cut and commingle the ingredients by reason of the action of the forward cutting-edges of the arms a and b and the continual changing of the ingredients by the lifting action of the arms, and the outward throw of the center or hub c and the inward throw of the ears a′ and b′, and when the first ingredients are thoroughly commingled the other ingredients are added and mixed in the same manner by the rotation of the beater-blade A.

The action of the hub or center c in throwing the material outward, will keep the shaft B clear of the material, and as the material is thrown both outward and inward by the action of the beater-blade it will be held down and prevented from flying upward and out of the receptacle and into the driving pinion and gear, so that in using the device the receptacle does not require a cover, and the operator can observe the exact condition of the mixture at all times or stages of the operation. The dropping of the center e of the cross-bar down brings such center below the top of the receptacle and enables the driving-pinion to be placed closer to the beater-blade, so that in operation the blade is held rigid and firm, and the power is applied where it will operate without straining the parts.

The beater-blade and its driving mechanism can be easily removed from the receptacle by simply withdrawing the arm F from the socket f, and when removed the blade and parts can be readily and quickly cleaned, as free access can be had to the blade and shaft when removed from the receptacle.

What I claim as new, and desire to secure by Letters Patent, is—

1. The combination, in a beater-blade, of a center or hub having an exterior winding face operating to lift and throw the material outward, a bottom arm having a forward cutting-edge and an upper lifting-face for cutting and throwing the material upward, and a second arm above the plane of the bottom arm and having a forward cutting-edge and an upper lifting-face for cutting and raising material to commingle the same, substantially as specified.

2. A beater-blade consisting of a hub or center having a concave winding exterior face, arms projecting on each side from the center of the hub, one arm above the other and each having a forward cutting-edge and an upper inclined face, and a lip on the outer end of each arm, each lip having a forward cutting-edge and a rounded inner face, substantially as and for the purposes specified.

3. The beater-blade A, having the arm a, with a lip a′ at its outer end, and the arm b, with a lip $b'$ at its outer end, and a center or hub $c$, with a concave winding exterior face, in combination with the shaft B, pinion C, and driving-gear D, substantially as and for the purposes specified.

4. The shaft B, pinion C, and cross-bar E, having the curved portion $e'$, plug $d'$, and arm F, in combination with the receptacle K, having the socket $f$ for mounting the operating parts of a beater and entering the beater-blade in said receptacle, substantially as and for the purposes specified.

GEORGE T. HUNT.

Witnesses:
O. W. BOND,
M. L. PRICE.